INVENTOR.
HAROLD R. WALKER
BY
Constantine A. Michalos
ATTORNEY

March 24, 1970 H. R. WALKER 3,502,813

ELECTRONIC VOTING SYSTEM

Original Filed Aug. 19, 1968 4 Sheets-Sheet 2

INVENTOR.
HAROLD R. WALKER

BY

Constantine A. Michalos
ATTORNEY

March 24, 1970 H. R. WALKER 3,502,813

ELECTRONIC VOTING SYSTEM

Original Filed Aug. 19, 1968 4 Sheets-Sheet 3

INVENTOR.
HAROLD R. WALKER

BY
Constantine A. Michalos
ATTORNEY

March 24, 1970 H. R. WALKER 3,502,813

ELECTRONIC VOTING SYSTEM

Original Filed Aug. 19, 1968 4 Sheets-Sheet 4

INVENTOR.
HAROLD R. WALKER

BY

Constantine A. Michalos
ATTORNEY

United States Patent Office 3,502,813

Patented Mar. 24, 1970

3,502,813

ELECTRONIC VOTING SYSTEM

Harold R. Walker, Metuchen, N.J., assignor to Charger Electronic Systems, Inc., New York, N.Y., a corporation of New York Continuation of application Ser. No. 753,430, Aug. 19, 1968. This application May 1, 1969, Ser. No. 822,102

Int. Cl. H04m *11/10*

U.S. Cl. 179—2 12 Claims

ABSTRACT OF THE DISCLOSURE

An electronic voting system for transmitting the votes of a multiplicity of voters through voter boxes or push button telephones including stepping devices such as stepping relays for receiving the singals and a recorder, such as electronic counters responding to the actuation of the relays to record the votes.

CROSS-REFERENCES TO THE RELATED APPLICATION

This application is a continuation of Ser. No. 753,430, now abandoned, and a continuation-in-part of a copending application entitled Electronic Voting System having Ser. No. 517,406 now abandoned filed in Group 233 on Dec. 29, 1965, by Harold R. Walker, the same inventor of this application.

BACKGROUND OF THE INVENTION

This invention relates to systems for instantaneously obtaining the votes of a multiplicity of voters, and more particularly, to a system for instantaneously transmitting the votes of a multiplicity of voters to a centralized receiving center with the voters being proximately located relative to the centralized receiving center, or located remotely therefrom.

Techniques currently utilized in mass communications media, such as television or radio, frequently require that viewers or listeners express their reactions to debates, public issues or particular news situations as well as their response to polls or their vote in a contest. These techniques are most effective when a large group of participating votes is reached, and the results of the poll are determined with speed and facility. Moreover, in order to provide comparative results, it may be desirable to have participation by voters in a studio or auditorium where the contest is taking place, as well as by remotely-located voters such as those who are in their homes viewing the contest on television. In the latter situation it is important for the system to be adaptable for use with existing transmission lines such as telephone lines, leading directly to the voter's home. In order to be so adaptable, the system must include means for providing voice frequency or audio tones so as not to create cross-talk over the telephone lines. Heretofore, voting systems have not been adaptable to use with existing telephone systems.

SUMMARY OF THE INVENTION

This invention contemplates a voting system for transmitting the responses of a multiplicity of voters to a centralized receiving center, comprising means for providing electrical signals corresponding to the responses, with the responses being in accordance with a predetermined program; means for receiving the signals and for sequentially transmitting signals corresponding to the received signals; means responsive to the sequentially transmitted signals so as to be actuated thereby; and, means connected to the last-mentioned means and responsive to the actuation thereof so as to indicate the total response of the multiplicity of voters.

Therefore, an object of this invention is to provide a voting system which will instantaneously transmit the responses of a multiplicity of voters to a centralized receiving center.

Another object of this invention is to provide a voting system which will instantaneously transmit the responses of a multiplicity of voters to a centralized receiving center, with the receiving center located proximately to the common location of all the voters.

Another object of this invention is to provide a voting system adaptable to existing telephone systems and using voice frequencies or audio tones at approved levels without creating cross-talk, to instantaneously transmit the responses of a multiplicity of voters to a centralized receiving center, with the voters being in various locations and receiving center located remotely from each of the voter locations.

These and othe objects and features of the invention are pointed out in the following description in terms of the embodiments thereof which are shown in the accompanying drawings. It is to be understood, however, that the drawings are for the purpose of illustration only and are not a definition of the limits of the invention, references being had to the appended claims for this purpose.

DESCRIPTION OF THE PREFERRED EMBODIMENTS

Figure 1:
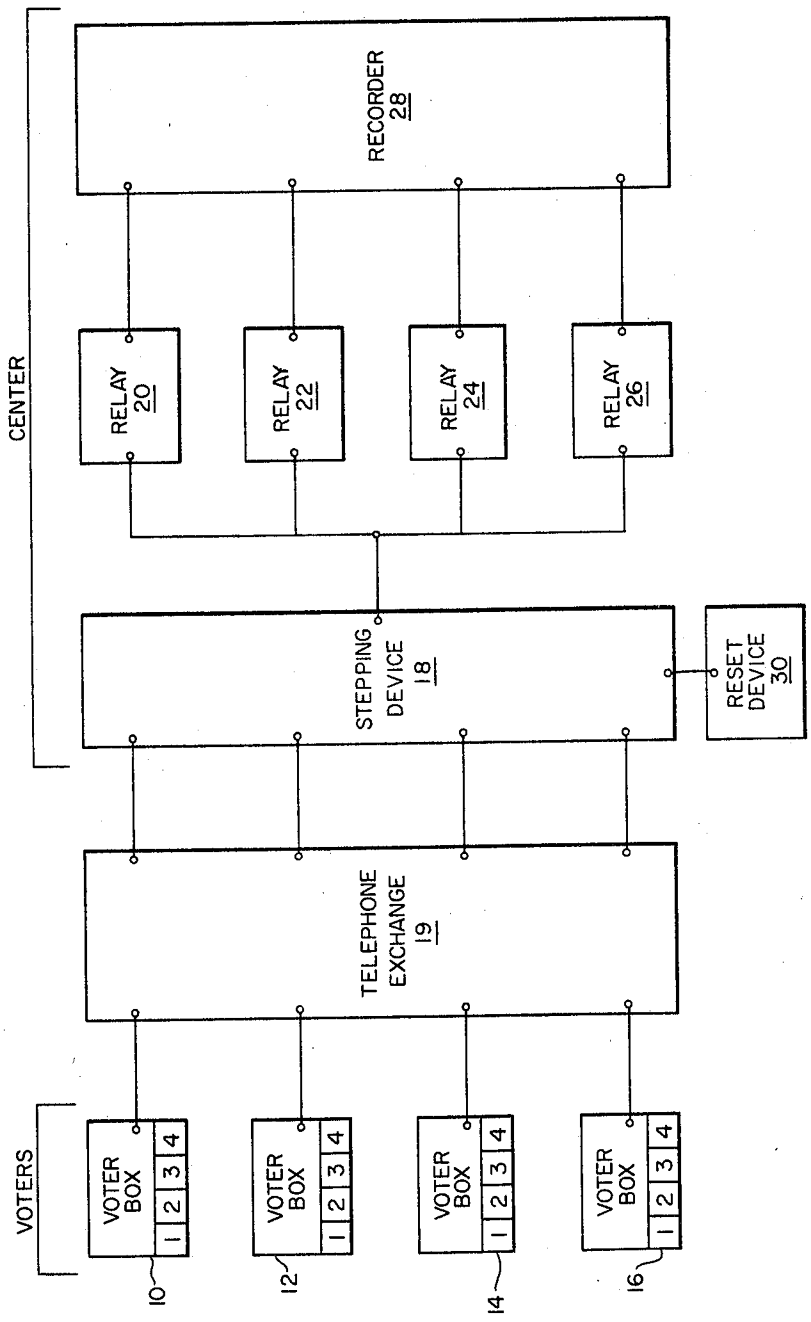
FIGURE 1 is a block diagram showing a system constructed in accordance with the present invention.

With reference to FIGURE 1, a multiplicity of voter boxes, shown for purposes of example as being four in number and designated by the numerals 10, 12, 14 and 16, are placed in proximity to cooperating voters. The voters may be in a central location such as an auditorium wherein a voter box such as the voter boxes 10, 12, 14 and 16 may be positioned in a convenient location on the seat occupied by the voter, or the voters may be in their homes wherein the voter box may be positioned near a telephone for purposes hereinafter to be described. A telephone exchange 19, is shown to indicate that the voters may be connected by means of telephone company provided lines.

Voter boxes 10, 12, 14 and 16 each have a switch arrangement which may be of the push-button type having four positions designated by the numerals 1, 2, 3 and 4. The switch positions 1, 2, 3 and 4 are arranged in accordance with a predetermined program so that actuation of the switch by the voter to one of the positions 1, 2, 3 or 4 provides a signal corresponding to a response such as an opinion, reaction, or selection with a response-provoking situation being viewed by the voters in the auditorium, or in their homes through a television broadcast.

The signals from voter boxes 10, 12, 14 and 16 are transmitted to a centralized receiving center. The signals are intercepted at the receiving center by a stepping device 18. Stepping device 18 may be a device such as a stepping relay which is well known in the art, and operates to sequentially receive each of the signals from voter boxes 10, 12, 14 and 16 by means of the resonant reed 20, 22, 24 or 26. Relays 20, 22, 24 and 26 are actuated by the signals transmitted through stepping device 18, recorder 28 operates in response to the actuation of the relays to record the multiplicity of responses. Recorder 28 may be a tape punch device of the teletype family, an arrangement of electronic counters or a magnetic tape system, in fact any device which will record and store one of the four choices from each line and then advance in synchronism with the stepping relay to record the signals from each line in turn.

Stepping device 18 is reset when the plurality of signals from voter boxes 10, 12, 14 and 16 have been sequentially advanced by a reset device 30. Reset device 30 may be, for example, a zero-hunting device, the arrangement of which for the purposes here noted, being well known in the art.

When the voters are remotely located relative to the receiving center, a system constructed in accordance with the present invention may utilize existing telephone lines to transmit signals provided by operating voting boxes 10, 12, 14 and 16 shown in FIGURE 1.

A motor driven switch may be employed at the centralized receiving center so as to dial the telephone numbers of participating voters. The switch is connected to an outgoing telephone line conveniently located to the receiving center and may be automatically operated using pre-punched discs or cards by means well known in the art, and referred to as auto dialers or auto call units, of which the Bell System 800 series Data Sets are examples. When the voter hears his telephone ring he operates a voter box such as the voter boxes 10, 12, 14 and 16 causing a signal having a predetermined audio tone or voice frequency at an approved level to be transmitted back to the receiving center. Each of the switch positions 1, 2, 3 and 4 in voter boxes 10, 12, 14 and 16 provide a signal of a pre-assigned frequency or tone, with this signal operating through a resonant reed relay 20, 22, 24 or 26 shown in FIGURE 1, causing the vote to be recorded by recorder 28.

Figure 2:
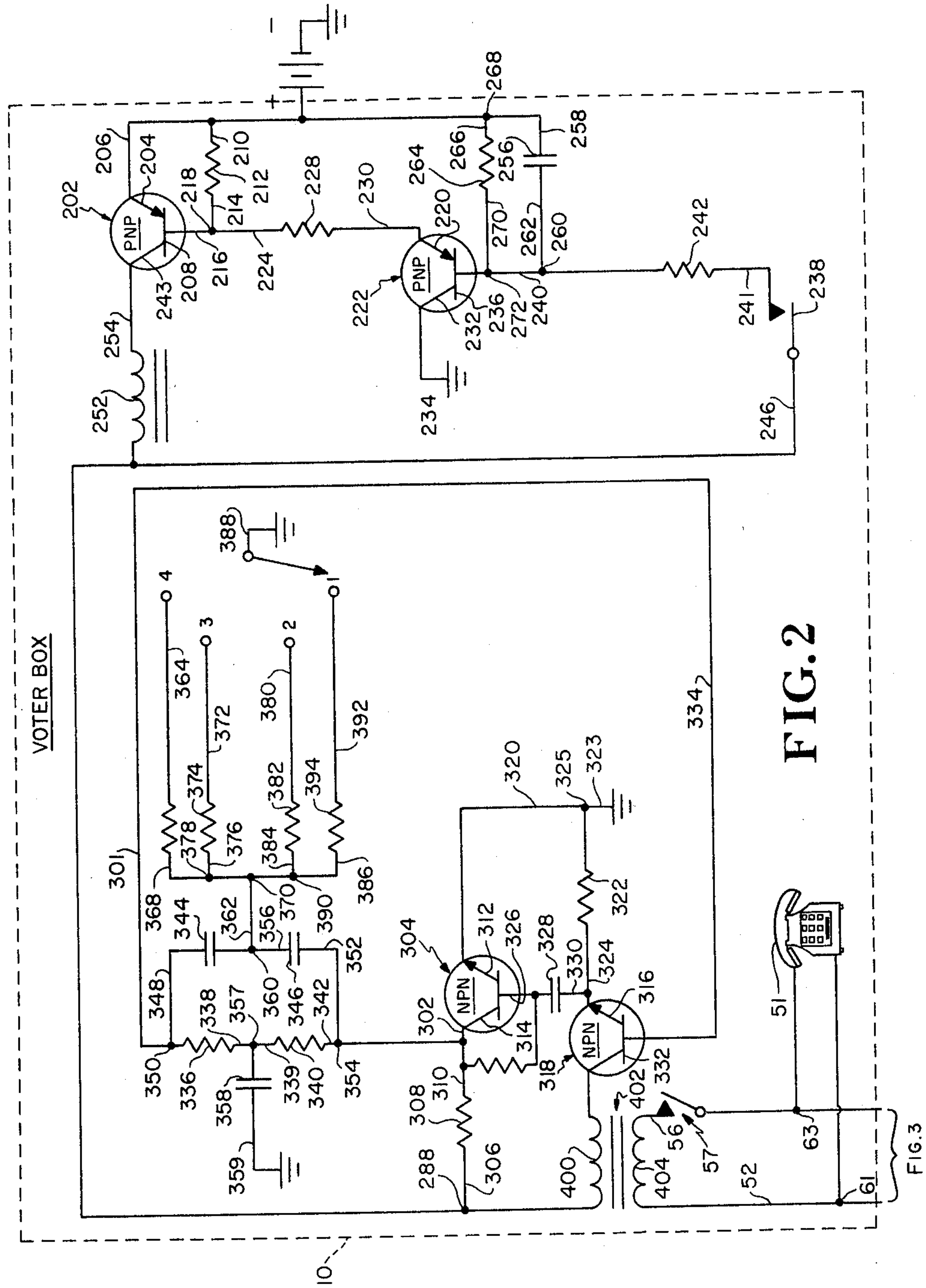
FIGURE 2 is a partial electrical schematic diagram of one embodiment of the invention constructed in accordance with the block diagram of FIGURE 1.
Figure 3:
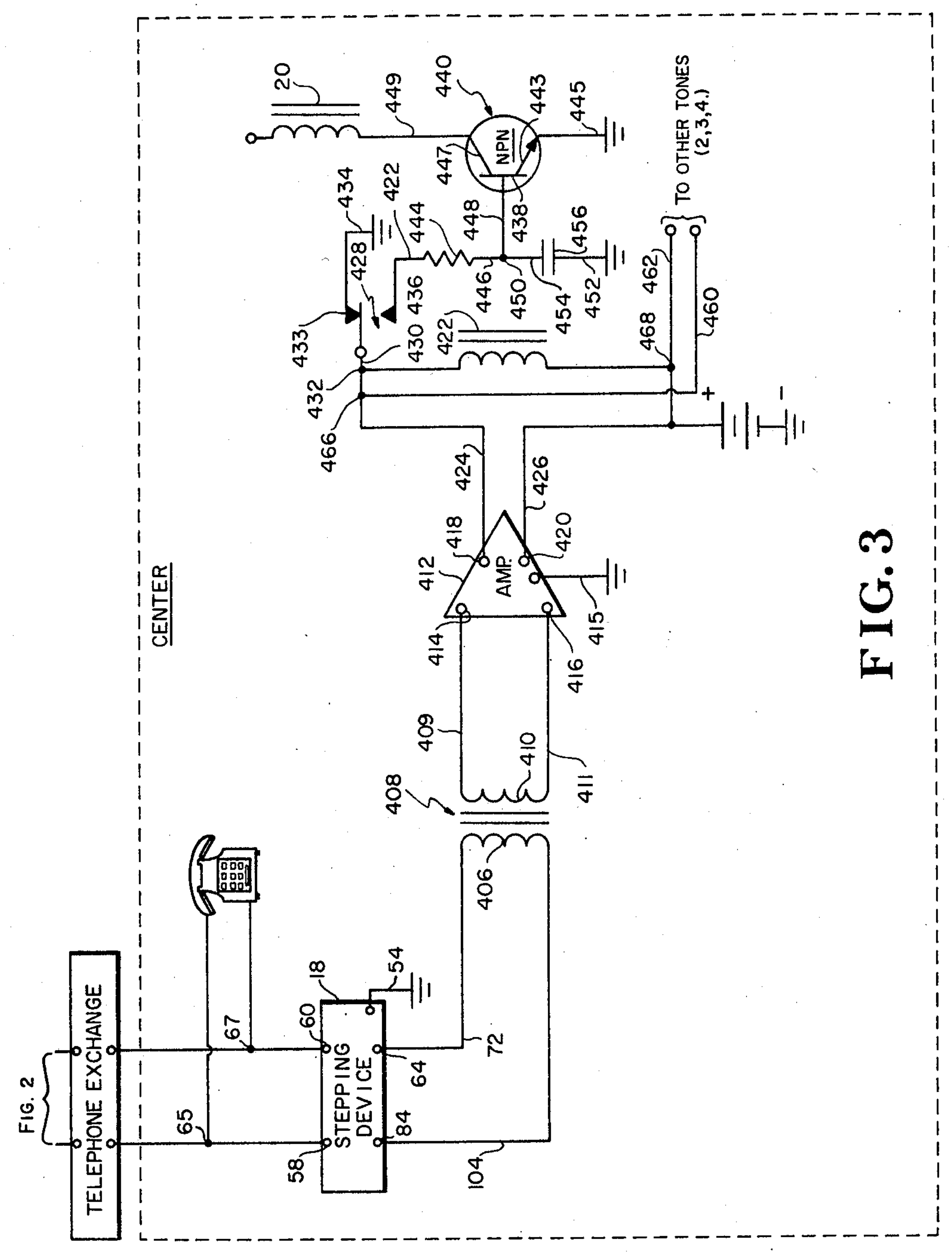
FIGURE 3 is another electronical schematic diagram of the other portion of the embodiment shown in FIGURE 2; and, FIGURE 4 is still another electronical schematic diagram showing a detailed portion of the device of FIGURES 1 and 2.

With reference to FIGURES 2 and 3, voter box 10, which is an oscillator and a time delay switch, includes a PNP type transistor 202 connected at an emitter 204 to the positive terminal of a power supply through a conductor 206. A base 208 of transistor 202 is connected to the positive terminal of a positive power supply through a conductor 210. A resistor 212 and a conductor 214 join a conductor 216 at junction 218. Base 208 of transistor 202 is connected to an emitter 220 of a PNP type transistor 222 through conductor 216, a conductor 224 joining conductor 216 at junction 218, a resistor 228 and a conductor 230. A collector 232 of transistor 222 is connected to a grounded conductor 234.

A base 236 of transistor 222 is connected to a switch 238 through a conductor 240, a resistor 242 and a conductor 241. Switch 238 is connected to a collector 243 of transistor 202 through a conductor 246, a relay 252, and a conductor 254. A capacitor 256 connected to the positive terminal of a power supply through a conductor 258 is connected to conductor 240 at a junction 260 through a conductor 262. A resistor 264 is connected across capacitor 256 through a conductor 266 joining conductor 258 at a junction 268 and a conductor 270 joining conductor 240 at a junction 272.

The output of voter box 10, is coupled at collector 243 of transistor 202, through conductor 301 to an input terminal 288. Terminal 288 is connected to a collector 302 of an NPN type transistor 304 through a conductor 306, a resistor 308 and a conductor 310. Transistor 304 has an emitter 312 and a base 314, with emitter 312 connected to a conductor 320, a resistor 322 and a conductor 324. Conductor 320 is connected to a grounded conductor 322 at a junction 325. Base 314 of transistor 304 is coupled to emitter 316 of transistor 318 through a conductor 326, a capacitor 328 and a conductor 330.

Transistor 318 has a base 332 coupled to collector 302 of transistor 304 through a conductor 334, a resistor 336, a conductor 338, a conductor 339, a resistor 340, and a conductor 342. A capacitor 344 and a capacitor 346 are connected across resistors 336 and 340, respectively, through a conductor 348 coupling capacitor 344 to conductor 334 at a junction 350, and a conductor 352 coupling capacitor 346 to conductor 342 at a junction 354. Capacitors 344 and 346 are coupled through a conductor 356. Interposed between resistors 336 and 340, at junction 357, is capacitor 358 which in turn is connected to a grounded conductor 359.

A switch 32 is connected to conductor 356 at a junction 360 through a conductor 362. Contacts 1, 2, 3 and 4 of switch 32 are respectively connected to conductor 362 through conductor 364, a resistor 366 and a conductor 368 joining conductor 362 at junction 370; a conductor 372, a resistor 374, and a conductor 376 joining conductor 368 at a junction 378; a conductor 380, a resistor 382 and a conductor 384 joining a conductor 386 at a junction 390; and, a conductor 392, and a resistor 394 connected to conductor 386, with conductor 386 joining conductor 362 at junction 370. In addition, the switch 32 is connected to a grounded conductor 388.

Conductor 301 is connected to a primary winding 400 of a transformer 402 with a secondary winding 404 of transformer 402 connected to stepping device 18 through conductors 52 and 56 at input terminals 58 and 60. In addition, conductor 56 is connected to terminal 60 of stepping device 18 through contacts 57 of the relay 352. Stepping device 18 is connected at output terminals 64 and 84 to a primary winding 406 of a transformer 408 through conductors 72 and 104, respectively.

The telephone exchange 19, shown in FIGURE 1, is shown connected to a pair of telephones 51 and 53 at junctions 50–53, and 65–67, respectively. A secondary winding 410 of transformer 408 is connected to an amplifier 412 at input terminals 414 and 416 through conductors 409 and 411, respectively. Amplifier 412 is connected to a grounded conductor 415.

The output of amplifier 412, at output terminals 418 and 420 is connected to a resonant reed relay 422 through conductors 424 and 426. A switch 428 is connected to conductor 424 through a conductor 430 joining conductor 424 at a junction 432. Switch 428 has a contact 433 connected to a grounded conductor 434 and a contact 436 connected to a base 438 of an NPN type transistor 440 through a conductor 442, a resistor 444, a conductor 446 and a conductor 448 joining conductor 446 at a junction 450. Junction 450 is coupled to a grounded conductor 452 through a conductor 454, and a capacitor 456. Transistor 440 has an emitter 443 connected to a grounded conductor 445 and a collector 447 connected to relay 20 through a conductor 449.

The output of amplifier 412 is applied through conductors 460 and 462 joining conductors 424 and 426 at junctions 466 and 468, respectively, to other relays 22, 24 and 26, shown in FIGURE 1, and therefore other tones in a manner as has been heretofore described in relation to relay 20. The other relays 20, 22, 24 and 26 are connected to recorder 28 shown in FIGURE 1.

With reference to FIGURES 2 and 3, as shown connected to A—A′ and B′—B′, respectively, voter box 10 includes an oscillator and a time delay switch. Transistors 332 and 314 form a parallel T oscillator which is well known in the art. The audio signal it generates coupled to the telephone line by transformer 402. Switch 32 contacts, which ground a portion of the parallel T circuit, are used to vary the transmitted frequency.

In operation, the respondent hears his telephone ring, at which time he presses button 1, 2, 3 or 4 of respondent device 10 (Voter box). This action does the following:

(1) Connects the box to the telephone line by closing contacts 57.

(2) Momentarily closes contact 238.

(3) Positions switch 32.

The momentary contact 238 charges condenser 256 which causes transistor 222 to conduct during the time required for the charge to dissipate through resistor 264 and the load presented by transistor 222.

This causes transistor 202 to conduct causing a relay (coil 252 and contact 57) to operate connecting the box ot the telephone line. When this connection is made, it is electrically equivalent to lifting the telephone from the cradle. This box makes it unnecessary to lift the telephone.

Condenser 256 will hold the connection for a predetermined time, for example, 30 seconds.

Simultaneously, with the action above, B+ is applied through wire 301 to the oscillator causing an audio to be generated. The frequency of this tone is determined by switch 32 and it is coupled to the line by transformer 402.

The above mentioned audio tone is sent back to the reception center through lines of the telephone company. At the reception center each line terminates in an instrument through which the tone could be heard. In order to tabulate votes electronically, a stepping device such as a stepping relay or its solid state equivalent, is used to scan the lines in sequence. The tone signals received are amplified by the amplifier 412 and used to cause a resonant reed relay 422 to close. A separate resonant reed is used for each tone to be received. When the proper tone is received, reed 428 vibrates, closing contact 436 and causing transistor 440 to conduct. When transistor 440 conducts it closes relay 20, which operates the recording device to punch a tape or light a light or record the vote in some similar manner.

Stepping device 18 scans the lines in sequence and the recording means record them in the system.

The tone responding devices are either resonant reed relays or frequency selective amplifiers, both of which are in common use. One complete set is used for each line. A stepping device 500, shown in FIGURE 3, scans the outputs of the receiving devices and stores the votes in sequence.

Figure 4:
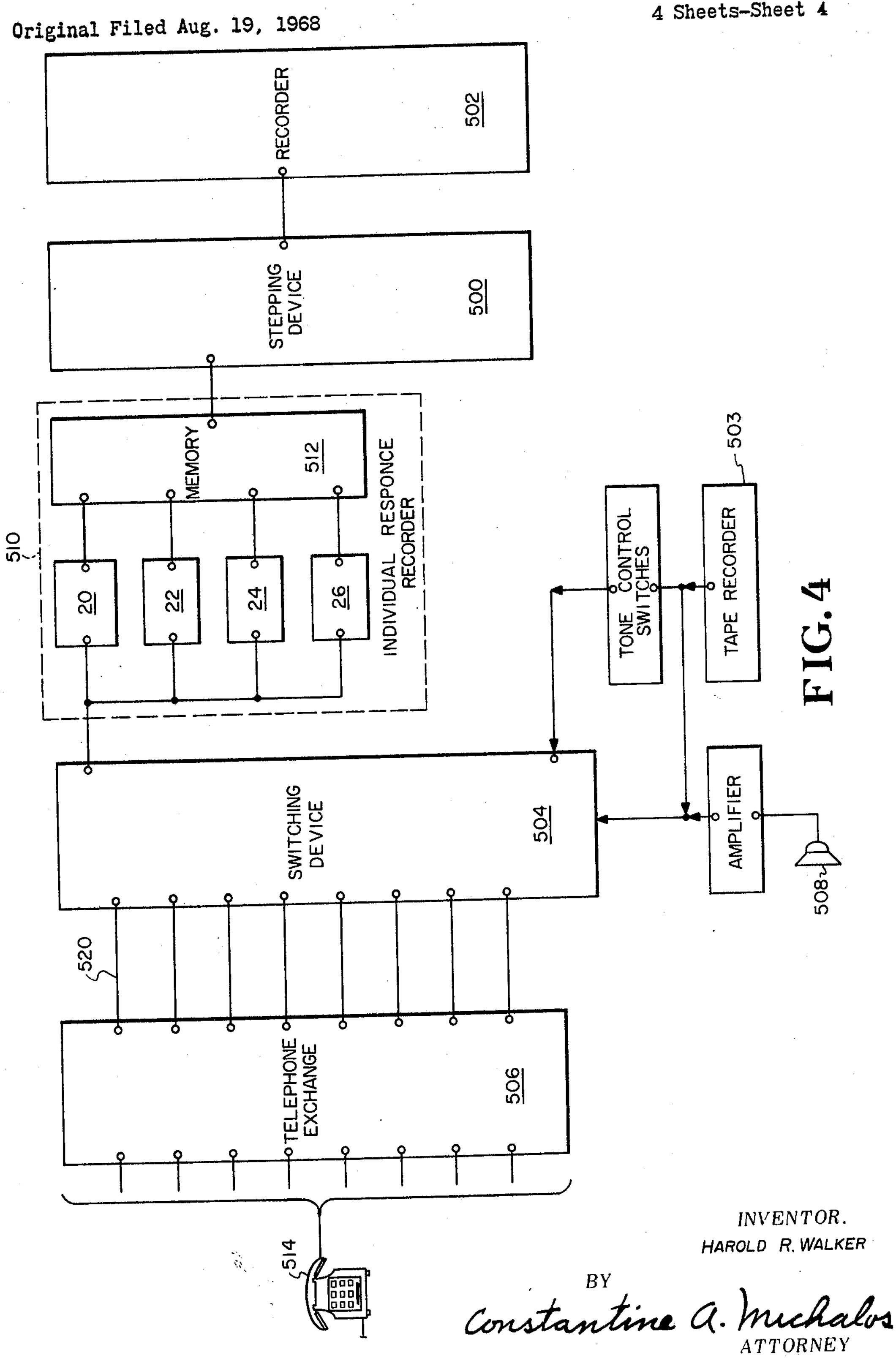

Referring now to FIGURE 4, the system operates as follows: The telephone numbers to be called are prearranged and stored on a tape as dial tones. Also stored on a tape are control tones which perform switching functions. To start the system, an operator starts a tape recorder 503. A control tone causes a switching device 504 to open a plurality of lines to a telephone exchange 506. After a discreet period to allow for dial tones to be received, the tape recorder 503 sends out a plurality of dialing tones. (Touch tone coded audio tones which cause the exchange to dial the proper numbers.) After the last dialing tone has been sent, the switching device 504 parallels all lines by what is commonly referred to as conference bridging.

At this time, an operator using a microphone 508 or a recorded voice will ask those answering to wait a moment for a poll or vote. After a discreet period when it is assumed all have answered, the voice will state the question to be voted upon and ask those on the line to vote at the sound of the tone. The tone when given, breaks the conference bridge and leaves each voter connected to an individual response recorder 510. The vote is stored, in memory 512, and then scanned by the stepping device 500 to record all the votes by recorder 502. It should be understood that for every incoming telephone line 520 there is one complementary individual response recorder unit 510.

Once the vote has been stored, the operator can again parallel all lines for another question or thank the pollees and cause all to hang up.

FIGURE 4 shows, therefore, a practical embodiment of the invention utilizing present day touch tone dial equipment. For this embodiment, the voter box 10 is replaced with a touch tone instrument 514 supplied by the telephone company. It is to be understood that this instrument includes the oscillator aforementioned and is a practical embodiment of the voter box of FIGURE 2.

While one embodiment of the invention has been illustrated and described, various changes in the form and relative arrangements of the parts, which will now appear to those skilled in the art may be made with departing from the scope of the invention. Reference is, therefore, to be has to the appended claims for a definition of the limits of the invention.

What is claimed is:

1. A method for collecting information utilizing a conventional telephone system of the type having telephones adapted to produce a plurality of different generated signals, said method including applying representative signals representing individual telephone respondents to respective trunk lines to establish respective connections with said respondents, connecting together said trunk lines after said respective connections have been established, simultaneously transmitting information to said respondents, and reconnecting said trunk lines individually to receive the generated signals from the respective respondents which are present on the individually connected trunk lines.

2. The method of claim 1, including the further step of recording said generated signals produced by said respondents.

3. The method of claim 1, including the further step of sequentially recording said signals representing individual telephone respondents on a recording medium prior to applying said signals representing individual telephone respondents to said respective trunk lines, and applying said signals representing said individual telephone respondents to said respective trunk lines from said recording medium.

4. An information transfer system for use with a telephone central office of the type having a plurality of input trunk lines, a plurality of output trunk lines connected with respective respondent receivers, each one of which is adapted to produce a plurality of different transmission signals, each of said output trunk lines being associated with a different selection signal, and connecting means responsive to a selection signal appearing on any one of said input trunk lines for connecting said one input trunk line with the output trunk line associated with that selection signal; said system comprising signal selection means for producing said different selection signals, a plurality of terminals, switching means for sequentially connecting said input trunk lines with said signal selection means whereby a different one of said selection signals is applied to each one of said plurality of input trunk lines and for connecting said input trunk lines individualy to a different terminal after said input trunk lines have been connected to respective output trunk lines, said switching means being further operable to bridge said plurality of input trunk lines together for a pre-selected interval of time, and transmission signal receiving means connected to each one of said terminals for receiving the transmission signal present at the associated terminal.

5. An information transfer system as in claim 4, in which said signal selection means includes storage means for storing said different selection signals in sequential order.

6. An information transfer system as in claim 4, and audio information means connected with said switching means for transmitting audio information, said switching means being further adapted to connect said audio information means with said input trunk lines when said input trunk lines are bridged together whereby the audio information is simultaneously applied to said input trunk lines.

7. An information transfer system as in claim 4, in which said switching means is responsive to a reconnect signal for reconnecting each one of said plurality of input trunk lines to a respective one of said plurality of terminals after said trunk lines have been bridged together.

8. An information transfer system as in claim 4, in which said transmission signal receiving means comprises memory means adapted to produce a signal representing the particular one of said plurality of transmission signals received at the associated terminal, stepping means including an output lead connected to each of said memory means for sequentially connecting said output lead with each of said memory means, and recording means connected with said output lead for sequentially recording the signals produced by each of said memory means.

9. A communication system for use with a telephone central office of the type having a plurality of input trunk lines, a plurality of output trunk lines connected with respective respondent receivers, each of which is capable of producing at least a first and a second signal, and connecting means for connecting selected output trunk lines with different input trunk lines in response to individual selection signals associated with each of said plurality of output trunk lines and applied to said different input trunk lines; said system comprising signal selection means for producing said individual selection signals, a plurality of terminals, switching means for connecting said signal selection means to at least a portion of said plurality of input trunk lines in sequence for a sufficient interval of time whereby each input trunk line of said portion of input trunk lines receives a different one of said individual selection signals and for connecting each one of said portion of said plurality of input trunk lines to a different one of said terminals, and signal receiving means coupled to each one of said terminals for receiving said first and second signals.

10. A communication system as in claim 9, in which said switching means includes bridging means for connecting said portion of said plurality of input trunk lines together after said connecting means has operated in response to said signal selection means and said respondent receivers have been selected.

11. A communication system as in claim 9, in which said first signal is a first audio frequency signal and said second signal is a second audio frequency signal, and said receiving means includes frequency selective means for indicating the reception of said first frequency or said second frequency signal.

12. A communication system as in claim 9, in which said receiving means comprises recording means for recording said first and second signals appearing at said terminals.

References Cited

UNITED STATES PATENTS

| | | | |
|---|---|---|---|
| 2,427,670 | 9/1947 | Goldsmith | 325—31 X |
| 2,465,976 | 3/1949 | Goldsmith | 325—31 X |
| 2,815,400 | 12/1957 | Poyolo | 179—2 |
| 3,126,513 | 3/1964 | Kamen | 325—31 |
| 3,210,472 | 10/1965 | Kamen | 179—2 |

RALPH D. BLAKESLEE, Primary Examiner